US011703448B2

(12) United States Patent
Ying et al.

(10) Patent No.: US 11,703,448 B2
(45) Date of Patent: Jul. 18, 2023

(54) SAMPLE SIGNAL AMPLIFICATION METHOD USING TERAHERTZ BAND GRAPHENE ABSORBER

(71) Applicant: ZHEJIANG UNIVERSITY, Zhejiang (CN)

(72) Inventors: Yibin Ying, Zhejiang (CN); Wendao Xu, Zhejiang (CN); Lijuan Xie, Zhejiang (CN)

(73) Assignee: ZHEJIANG UNIVERSITY, Zhejiang (CN)

( * ) Notice: Subject to any disclaimer, the term of this patent is extended or adjusted under 35 U.S.C. 154(b) by 0 days.

(21) Appl. No.: 17/764,205

(22) PCT Filed: Feb. 24, 2020

(86) PCT No.: PCT/CN2020/076339
§ 371 (c)(1),
(2) Date: Mar. 28, 2022

(87) PCT Pub. No.: WO2021/093216
PCT Pub. Date: May 20, 2021

(65) Prior Publication Data
US 2022/0341846 A1 Oct. 27, 2022

(30) Foreign Application Priority Data
Nov. 15, 2019 (CN) .......................... 201911119236.6

(51) Int. Cl.
*G01N 21/3586* (2014.01)
*G01N 21/3581* (2014.01)
(52) U.S. Cl.
CPC ................ *G01N 21/3586* (2013.01)
(58) Field of Classification Search
CPC ........... G01N 21/3586; G01N 21/3581; G01N 21/553
See application file for complete search history.

(56) References Cited

U.S. PATENT DOCUMENTS 11,029,213 B2 * 6/2021 El Fatimy ............. G01J 5/0837
2018/0315880 A1 11/2018 Jadidi et al.

FOREIGN PATENT DOCUMENTS

CN 103487953 1/2014
CN 107146955 9/2017
(Continued)

OTHER PUBLICATIONS

"International Search Report (Form PCT/ISA/210) of PCT/CN2020/076339," dated Jul. 29, 2020, with English translation thereof, pp. 1-4.
(Continued)

*Primary Examiner* — David P Porta
*Assistant Examiner* — Fani Polyzos Boosalis
(74) *Attorney, Agent, or Firm* — JCIP Global Inc.

(57) ABSTRACT

A sample signal amplification method using a terahertz band graphene absorber is provided. The method comprises: fabricating a graphene absorber through steps of metal evaporation, graphene transfer and the like; preparing sample solutions having different concentrations; dropwise adding a sample solution to the surface of the graphene absorber, and then drying in the air at room temperature; collecting terahertz time-domain signals of all sample points to be detected and reference sample points on the surface of the graphene absorber; and calculating absorption rates of all the sample points to be detected and the reference sample points according to the terahertz time-domain signals, and calculating the intensity change of an absorption peak according to the intensity value corresponding to the highest point of the absorption peak.

10 Claims, 4 Drawing Sheets

(56) References Cited

FOREIGN PATENT DOCUMENTS

| CN | 206558698 | | 10/2017 | | |
|----|-----------|---|---------|---|---|
| CN | 110545654 B | * | 9/2020 | ........... | H05K 9/0088 |
| CN | 214584886 U | * | 11/2021 | ......... | G01N 21/3581 |

OTHER PUBLICATIONS

"Written Opinion of the International Searching Authority (Form PCT/ISA/237) of PCT/CN2020/076339," dated Jul. 29, 2020, pp. 1-4.

* cited by examiner

SAMPLE SIGNAL AMPLIFICATION METHOD USING TERAHERTZ BAND GRAPHENE ABSORBER

CROSS-REFERENCE TO RELATED APPLICATION

This application is a 371 of international application of PCT application serial no. PCT/CN2020/076339, filed on Feb. 24, 2020, which claims the priority benefit of China application no. 201911119236.6, filed on Nov. 15, 2019. The entirety of each of the above mentioned patent applications is hereby incorporated by reference herein and made a part of this specification.

BACKGROUND

Field of the Disclosure

The disclosure relates to a terahertz signal amplification method for a sample, in particular to a sample signal amplification method using a terahertz band graphene absorber.

Description of Related Art

Due to fast detection speed and simple operation of spectroscopy technology, such technology has gradually attracted attention of domestic and foreign scholars. Terahertz spectroscopy, as an emerging spectroscopy technology, has gradually attracted the attention of scholars from all over the world. Because the vibration and rotation energy levels of most macromolecules and the intermolecular forces are all in the terahertz band, terahertz waves have great potential for realizing sample detection. In the fields where terahertz spectroscopy technology has great application prospects, such as security inspection, biology, medicine, agriculture, and material characterization, there is a demand for trace or even ultra-trace nondestructive detection. In addition, in actual detection applications, the surface of the sample to be tested is usually curved, and it is highly essential to achieve a close adhesion between the surface of the sample to be detected and the surface of the sensor. However, although the metamaterials currently used in sample detection in this subject area can significantly enhance the signal of the sample, it is difficult to achieve close adhesion between the metamaterial and the surface of the detected sample due to the presence of periodic microstructures.

SUMMARY OF THE DISCLOSURE

The technical problem to be solved by the disclosure is to overcome the shortcomings of the above-mentioned background technology and provide a sample signal amplification method using a terahertz band graphene absorber. The method should have the characteristics of high sensitivity, rapid and convenient detection, and be closely adhered to the curved surface to be detected.

The technical solution adopted by the disclosure includes the following steps.

1) Fabrication of graphene absorber: A graphene absorber containing graphene, polyimide, and metal anti-transmission layer from top to bottom is fabricated.

2) Various sample solutions of different concentrations are prepared.

3) The sample solution is dripped on the surface of the graphene absorber: The sample solution is dripped on the surface of a cleaned graphene absorber. At least three drops are added from the solution of each concentration, and the drop is added at the same amount each time. Three reference sample points are arranged freely, and the position of the reference sample point is different from that of the sample point to be detected, and the surface of graphene absorber is dried at room temperature after dripping the solution.

4) The terahertz time-domain signals of all the sample points to be detected and the reference sample points on the surface of the graphene absorber are collected: Under a nitrogen atmosphere, the terahertz time-domain signals of the sample point to be detected and the reference sample point are respectively collected from the same graphene absorber in the spectral bandwidth of 0.1-10 THz.

5) The intensity change of the absorption peak of the graphene absorber is obtained from the terahertz time-domain signal:

The fast Fourier transform is adopted to convert the terahertz spectrum time-domain signal to the frequency-domain signal. The absorption rate of the sample point to be detected and the absorption rate of the reference sample point are calculated based on the frequency-domain signal. The difference between the absorption rate of the sample point to be detected and the absorption rate of the reference sample point is adopted as the detection signal, thereby calculating the intensity change of the absorption peak according to the intensity value corresponding to the highest point of the absorption peak, so as to realize the amplification of the sample signal.

In the disclosure, the result on the surface of graphene absorber is adopted in a special manner as a sensor for sample signal amplification processing.

In the step 1), the graphene absorber is made in the following way.

1.1) Evaporation of metal on the surface of silicon sheet or quartz sheet.

A cleaned silicon sheet or quartz sheet is taken, and titanium with a thickness of 10 nm and gold with a thickness of 100-200 nm are formed on the surface of the silicon sheet or quartz sheet successively via the evaporation.

1.2) Polyimide tape or polyimide layer is applied.

The polyimide tape is gently adhered on the surface of the metal-evaporated silicon sheet or quartz sheet or a thin polyimide layer is added on the metal surface by means of homogenization.

1.3) Finally, a layer of the graphene is transferred on the polyimide tape or the thin polyimide layer.

In the step 1), the graphene absorber can also be fabricated in the following manner. The graphene absorber obtained by the following method is flexible: To fabricate a flexible graphene absorber with metal as the anti-transmission layer, a thin polyimide film is taken, a metal layer is formed on the surface of the thin polyimide film via the evaporation, and graphene is transferred on the other surface of the thin polyimide film after the evaporation is completed.

In the step 1), the graphene absorber can also be fabricated in the following manner. The graphene absorber obtained by the following method is flexible: To fabricate a flexible graphene absorber with a conductive tape as the anti-transmission layer, a thin polyimide film is taken, graphene is transferred on one surface of the thin polyimide film, and the conductive tape is adhered on the other surface of the thin polyimide film after the transfer is completed.

The thickness of the polyimide is 10-100 μm.

In the step 1), the graphene is obtained by chemical vapor deposition or mechanical exfoliation, and the number of layers of the graphene is 1-10.

When the terahertz time-domain signal is collected in the step 4), the detection area of the sample point to be detected is greater than 1 mm$^2$, and the humidity of the measurement environment is less than 0.2%.

The sample solution adopts chlorpyrifos methyl, lactose, chlorothalonil, and the like. The interaction between the sample and the graphene absorber is chemical doping, and chemical doping can effectively change the Fermi level of graphene.

The concentration range of the sample solution obtained in the preparation of step 2) is between 0.01 mg/L and 100 mg/L; in the step 3), the amount of each drop of the sample solution is 5 to 200 μL.

In the step 3), the graphene absorber is cleaned in the following manner: A complete graphene absorber is taken, the graphene absorber is washed with deionized water, acetone, and deionized water successively, and dried with nitrogen.

The preferred specific implementation of chlorpyrifos-methyl of the disclosure can be selected from chlorpyrifos-methyl with the product number 45396-250MG produced by Sigma, but the disclosure is not limited thereto.

The preferred specific implementation of chlorothalonil of the disclosure can be selected from chlorothalonil with the product number 36791-250MG produced by Sigma, but the disclosure is not limited thereto.

The preferred specific implementation of lactose of the disclosure can be selected from lactose with the product number 47287-U produced by Sigma, but the disclosure is not limited thereto.

The preferred specific implementation of graphene of the disclosure can be selected from Trivial Transfer Graphene produced by ACS Material, but the disclosure is not limited thereto.

The preferred specific implementation of polyimide tape and film of the disclosure can be selected from the polyimide tape and the polyimide film produced by Kapton, but the disclosure is not limited thereto.

The metal anti-transmission layer of the disclosure can be replaced with silver, copper, aluminum, titanium and the like.

The polyimide dielectric layer of the disclosure can be replaced with photoresist, such as SU-8.

The graphene layer of the disclosure can be replaced with a semi-metal, such as tungsten ditelluride.

For recommendation, the preferred specific implementation of terahertz time-domain spectroscopy system of the disclosure adopts a terahertz time-domain spectroscopy system with model z3 produced by Z-omega.

The terahertz time-domain spectroscopy (THz-TDS) adopted by the disclosure is a detection technology developed and promoted internationally in recent years. Terahertz time-domain spectroscopy technology has been used in many fields such as national defense, medicine, chemistry, agriculture and materials. Terahertz wave is an electromagnetic wave with a wavelength between microwave and infrared radiation, and its frequency is 0.1-10 THz, and fingerprint peaks of many molecules appear in this band.

The graphene absorber of the disclosure is a structure in which graphene a dielectric material, and a metal anti-transmission layer structure are arranged in sequence, which satisfies the impedance matching condition and can absorb electromagnetic waves in a specific band. Compared with the terahertz-band metamaterial absorber, the periodic structure on the surface of the metamaterial absorber creates a gap with the surface of the sample to be detected, which affects the sensitivity of detection. The prominent advantage of the disclosure is that the graphene absorber has no periodic metal structure. The surface of the graphene absorber is flat, suitable for close adhesion with the curved surface; there is no gap, and the detection sensitivity is improved.

Therefore, the disclosure utilizes the terahertz graphene absorber technology, which has the following advantageous effects.

The disclosure adopts a graphene absorber in the terahertz band to amplify sample signal by using the change in chemical properties (change in the Fermi level of graphene), and the change is caused by the chemical doping of graphene and the sample.

The disclosure simultaneously utilizes the characteristics of flexibility and flat surface of the graphene absorber, and the absorber is used for the detection of samples distributed on the curved surface.

Compared with conventional tableting technology, the method of the disclosure can greatly improve the detection sensitivity. Compared with the metamaterial signal amplification method, the graphene absorber in the method of the disclosure has no periodic structure, and the surface thereof is flat and therefore can be closely adhered to the curved surface. Moreover, the method of the disclosure is simple and quick to operate, and can satisfy the increasing demand for rapid detection.

DESCRIPTION OF EMBODIMENTS

The disclosure will be further described below in conjunction with implementation examples, but the disclosure is not limited to the following examples.

The embodiment of the disclosure is as follows.

Example 1

(1) Fabrication of Graphene Absorber

Figure 1:
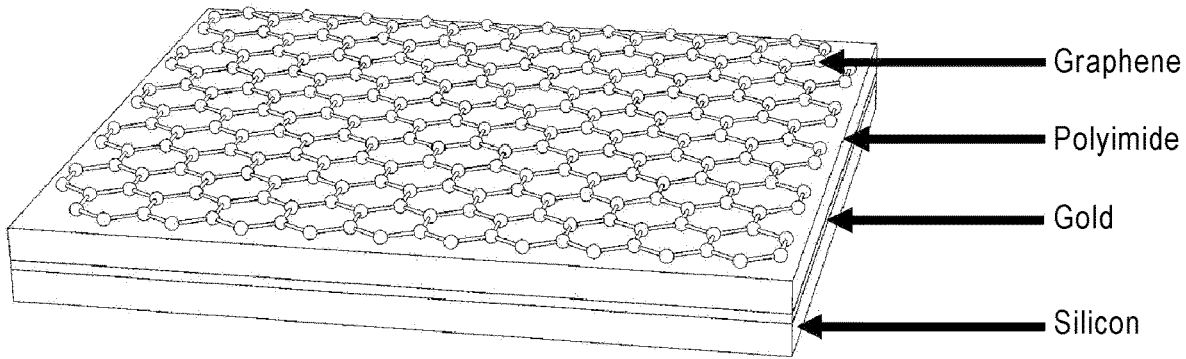
FIG. 1 is a schematic view of the structure of the graphene absorber of the disclosure.

A silicon sheet or a quartz sheet is taken. The silicon sheet or quartz sheet is subjected to ultrasonic cleaning in acetone, isopropanol, and water respectively for 10 minutes, and then dried with nitrogen. Then, by means of evaporation, the surface of the silicon sheet or quartz sheet is formed with 10 nm of titanium and 200 nm of gold successively as an anti-transmission layer. A polyimide tape (the thickness is 50-100 μm) is adhered on the gold surface. There should be no bubbles between the polyimide tape and the metal anti-transmission layer. Finally, a graphene layer is transferred on the polyimide tape, and the structural diagram of the graphene absorber is shown in FIG. 1.

Specifically, the transfer of graphene can be performed by using the following methods.

The purchased graphene is released into water for at least 2 hours. Tweezers are used to clamp the silicon sheet or quartz sheet with polyimide tape to adhere to the graphene in the water. After adjusting the graphene to a suitable position and removing the graphene from the water, the graphene is kept vertically for 3 minutes in a standing state to allow excess water to flow out and then the graphene is dried for 30 minutes. Thereafter, the graphene is dried in an oven at 100° C. for 20 minutes. The graphene is kept still to room temperature, and acetone is added to the graphene for soaking for about 10 minutes. The PMMA protective layer on the surface is removed, and the graphene absorber is taken and washed with deionized water and dried with nitrogen.

(2) The Preparation of Chlorpyrifos Methyl Solution

Chlorpyrifos methyl solutions with eight concentration gradients are prepared respectively. In this example, the eight concentration gradients are 0.01 mg/L, 0.02 mg/L, 0.05 mg/L, 0.10 mg/L, 0.20 mg/L, 0.30 mg/L, 0.40 mg/L, and 0.50 mg/L.

(3) Chlorpyrifos Methyl Solution is Dripped on the Surface of the Graphene Absorber 10 μL of chlorpyrifos methyl solution is taken, and the chlorpyrifos methyl solution is dripped on the surface of the cleaned graphene absorber. Three drops are added from the solution of each concentration, and three reference sample points (without any samples) are set. The surface of the graphene absorber is dried at room temperature, and the detection area of sample points to be detected is about 4 mm².

(4) The Terahertz Time-Domain Spectrum of all Sample Points to be Detected, Reference Sample Points and Metal Mirrors on the Surface of the Graphene Absorber are Collected The laser, the computer, the controller and the nitrogen valve are turned on. Under the circumstances, the terahertz time-domain spectroscopy system starts to fill with nitrogen and the humidity drops. The laser can be measured after being preheated for half an hour. The cover of the terahertz time-domain spectroscopy system for measurement is opened, and the graphene absorber is placed into the detection optical path and fixed by a fixture. Under the condition of filling nitrogen, when the spectrum bandwidth of the terahertz time-domain spectroscopy system is 0.1-3.5 THz, the terahertz time-domain spectroscopy of the sample points to be detected and the reference sample points on the same graphene absorber are collected respectively. The metal mirror is placed into the detection optical path and fixed with a fixture. Under the condition of filling nitrogen, when the spectrum bandwidth of the terahertz time-domain spectroscopy system is 0.1-3.5 THz, the terahertz time-domain spectrum of the metal mirror is collected, wherein the humidity in measurement environment is required to be <0.2%, and the temperature is room temperature. The above method is used to measure the terahertz time-domain spectrum of the sample one by one, and the measured data is saved, thus obtaining the terahertz time-domain spectrum data set of all reference points to be detected and the reference sample points.

(5) The Absorption Rate of all Sample Points to be Detected is Calculated, and the Intensity Corresponding to the Absorption Peak is Searched The fast Fourier transform is used to convert the terahertz spectrum time-domain signal of the sample to the frequency-domain signal, and the frequency-domain signal is used to obtain the absorption rate of the sample point to be detected.

Due to the presence of the metal anti-transmission layer, the transmittance of the graphene absorber is 0. Therefore, the absorption rate of the graphene absorber can be obtained by the following formula:

$$A=|1-(E_{(sample)}/E_{(metal)})^2|*100\%$$

In the above formula, A represents the absorption rate of the graphene absorber, $E_{(sample)}$ represents the electric field intensity of the sample point to be detected or the reference sample point in the reflection mode, and $E_{(metal)}$ represents the electric field intensity of the metal mirror in the reflection mode.

Figure 2:
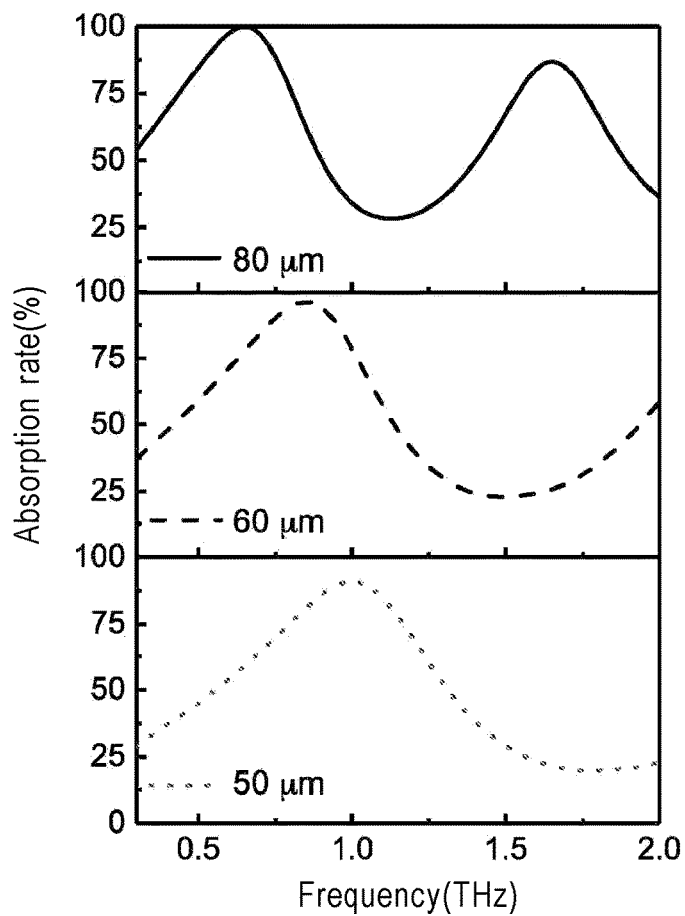
FIG. 2 is the absorption spectrum obtained by simulation of the graphene absorber of the disclosure under the condition in which polyimide is provided with different thicknesses.
Figure 3:
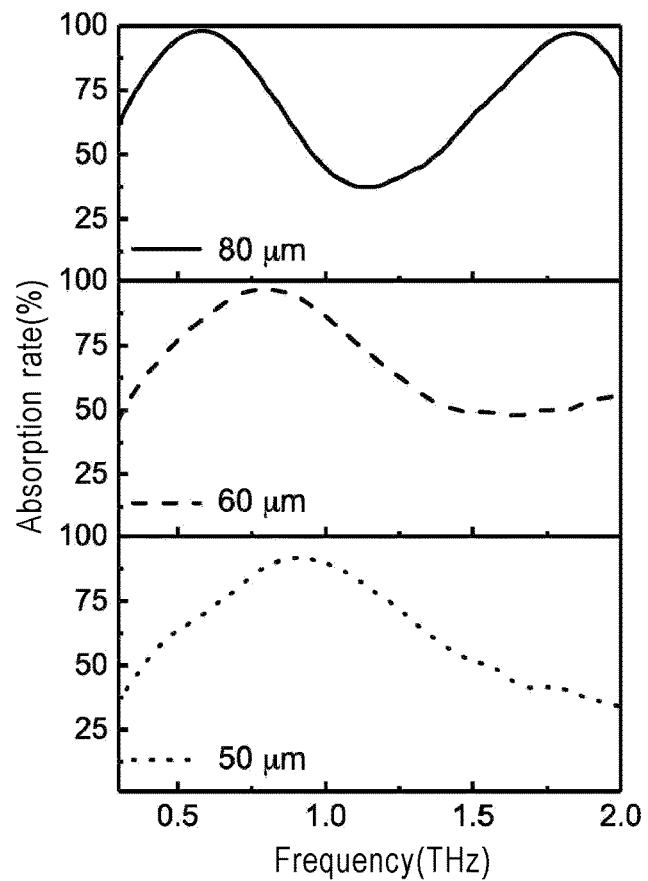
FIG. 3 shows the absorption spectrum obtained by experiments carried out for the graphene absorber of the disclosure under the condition in which polyimide is provided with different thicknesses.

The absorption spectrum obtained by simulation and experiment of the graphene absorber under the condition in which polyimide is provided with different thicknesses are shown in FIG. 2 and FIG. 3, respectively.

Figure 4:
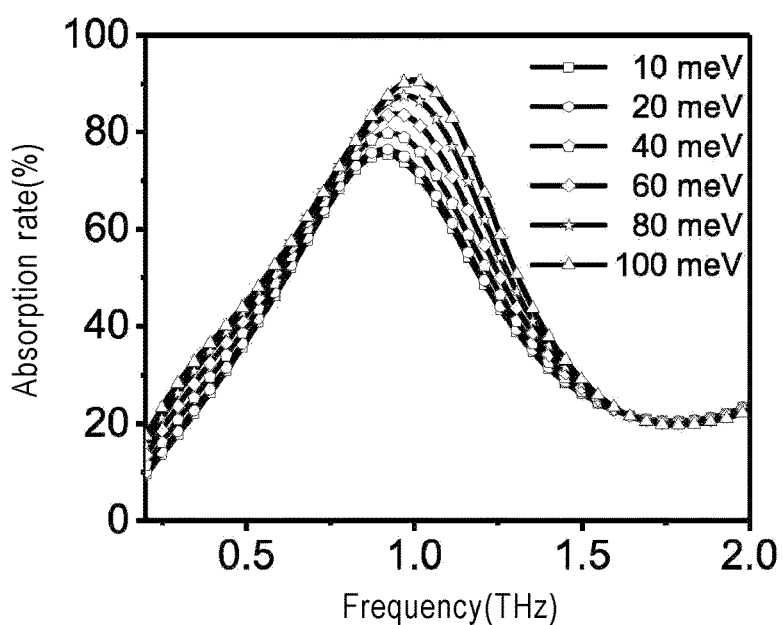
FIG. 4 is the absorption spectrum obtained by simulation of the graphene absorber of the disclosure under the condition in which graphene is provided with different Fermi levels.

FIG. 4 is the absorption spectrum obtained by simulation of the graphene absorber under the condition in which graphene is provided with different Fermi levels.

Figure 5:
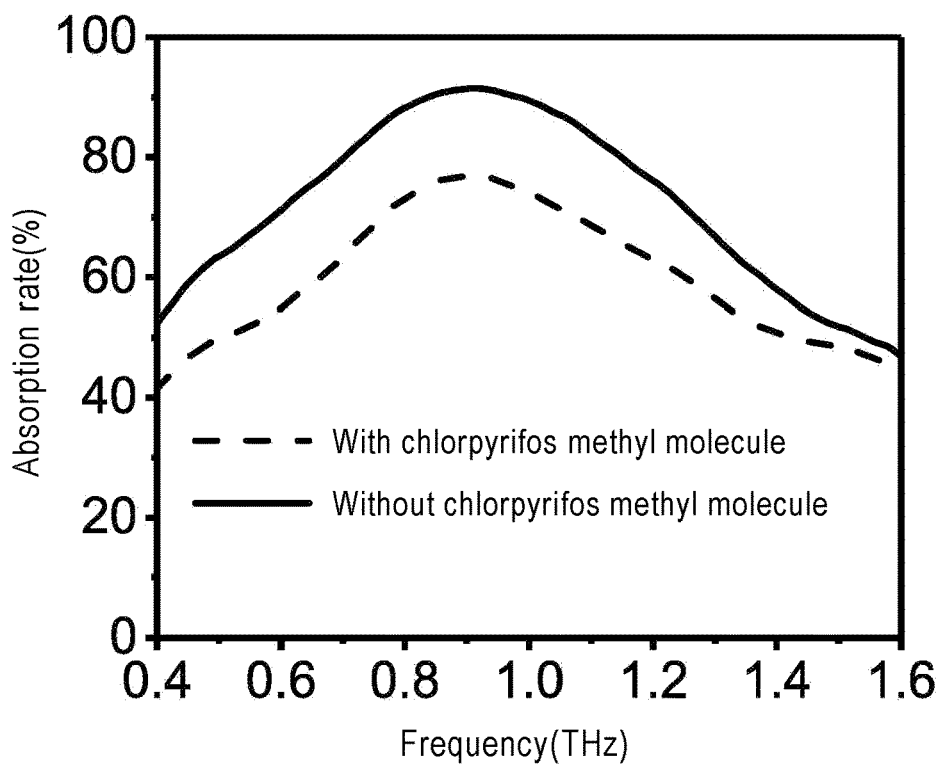
FIG. 5 is the absorption spectrum of the graphene absorber in Example 1 of the disclosure in the presence/absence of chlorpyrifos methyl molecules.
Figure 6:
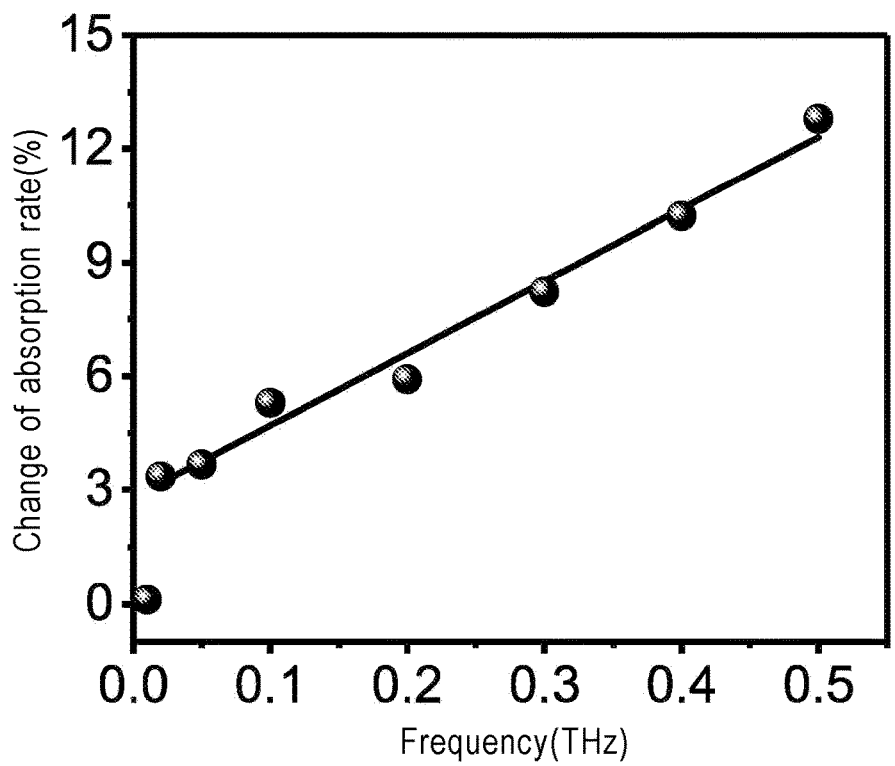
FIG. 6 is a graph showing the intensity change of the absorption spectrum of the graphene absorber, and the intensity change is caused by chlorpyrifos methyl molecule in Example 1 of the disclosure.

The intensity corresponding to the maximum value of the absorption peak is searched. Subtraction is performed on the intensity value of the sample point to be detected with respect to the intensity value of the reference sample point, so as to obtain the change in the intensity of the absorption peak. FIG. 5 is the absorption spectrum of the graphene absorber in the presence/absence of chlorpyrifos methyl molecules. FIG. 6 is a graph showing the intensity change of the absorption spectrum of the graphene absorber, and the intensity change is caused by chlorpyrifos methyl molecule.

Example 2

(1) Fabrication of Flexible Graphene Absorber

A polyimide film with a thickness of 50 μm is taken. The polyimide film is subjected to ultrasonic cleaning in acetone, isopropanol, and water respectively for 10 minutes, and then dried with nitrogen. Then, by means of evaporation, the surface of the polyimide film is formed with 10 nm of titanium and 150 nm of gold successively as an anti-transmission layer. Thereafter, a graphene layer is transferred on the polyimide film.

Specifically, the transfer of graphene can be performed by using the following methods.

The purchased graphene is released into water for at least 2 hours. Tweezers are used to clamp the polyimide film to put the polyimide film into water in an oblique manner. If necessary, another tweezers may be used to press the polyimide film into the water. The unplated side of the polyimide film is adhered to the graphene in the water. After adjusting the graphene to a suitable position and removing the graphene from the water, the graphene is kept vertically for 3 minutes in a standing state to allow excess water to flow out and then the graphene is dried for 30 minutes. Thereafter, the graphene is dried in an oven at 100° C. for 20 minutes. The graphene is kept still to room temperature, and acetone is added to the graphene for soaking for about 10 minutes. The PMMA protective layer on the surface is removed, and the graphene absorber is taken and washed with deionized water and dried with nitrogen.

(2) The Preparation of Chlorothalonil Solution

The chlorothalonil solution is prepared, and the concentration in this embodiment is 0.60 mg/L.

(3) The Chlorothalonil Solution is Dripped on the Surface of an Apple

100 μL of chlorothalonil solution is taken and dripped on the surface of a cleaned apple. A flexible graphene absorber is adhered to the surface of the apple dripped with the chlorothalonil solution. The chlorothalonil solution is collected and dried at room temperature. The above steps are repeated for three times to obtain three sample points to be detected. The detection area of each sample point to be detected is about 10 $mm^2$; and three reference sample points (only flexible graphene absorber, no samples are adopted) are set.

(4) The Terahertz Time-Domain Spectra of all Sample Points to be Detected, Reference Sample Points and Metal Mirrors on the Surface of the Flexible Graphene Absorber are Collected The laser, the computer, the controller and the nitrogen valve are turned on. Under the circumstances, the terahertz time-domain spectroscopy system starts to fill with nitrogen and the humidity drops. The laser can be measured after being preheated for half an hour. The cover of the terahertz time-domain spectroscopy system for measurement is opened, and the graphene absorber is placed into the detection optical path and fixed by a fixture. Under the condition of filling nitrogen, when the spectrum bandwidth of the terahertz time-domain spectroscopy system is 0.1-3.5 THz, the terahertz time-domain spectroscopy of the sample points to be detected and the reference sample points on the same graphene absorber are collected respectively. The metal mirror is placed into the detection optical path and fixed with a fixture. Under the condition of filling nitrogen, when the spectrum bandwidth of the terahertz time-domain spectroscopy system is 0.1-3.5 THz, the terahertz time-domain spectrum of the metal mirror is collected, wherein the humidity in measurement environment is required to be <0.2%, and the temperature is room temperature. The above method is used to measure the terahertz time-domain spectrum of the sample one by one, and the measured data is saved, thus obtaining the terahertz time-domain spectrum data set of all reference points to be detected and the reference sample points.

Figure 7:
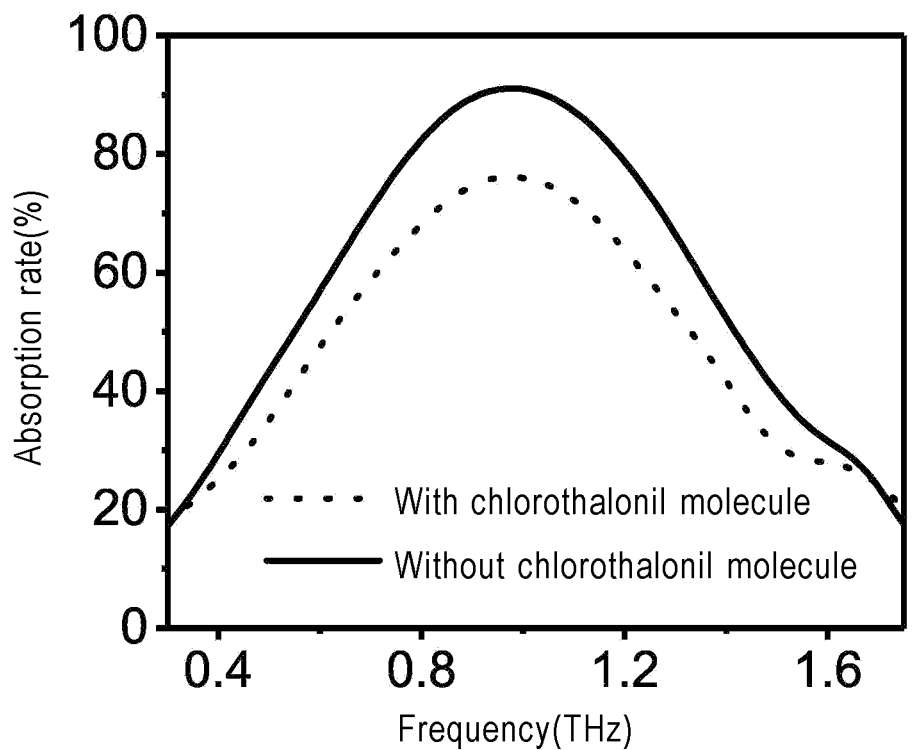
FIG. 7 is the absorption spectrum of the graphene absorber in Example 2 of the disclosure in the presence/absence of chlorothalonil molecules.

(5) The Absorption Rate of all Sample Points to be Detected is Calculated, and the Intensity Corresponding to the Absorption Peak is Searched The fast Fourier transform is used to convert the terahertz spectrum time-domain signal of the sample to the frequency-domain signal, and the frequency-domain signal is used to obtain the absorption rate of the sample point to be detected. The intensity corresponding to the maximum value of the absorption peak is searched. Subtraction is performed on the intensity value of the sample point to be detected with respect to the intensity value of the reference sample point, so as to obtain the change in the intensity of the absorption peak. FIG. 7 is the absorption spectrum of the graphene absorber in the presence/absence of chlorothalonil molecules.

Example 3

(1) Fabrication of Graphene Absorber

A silicon sheet or a quartz sheet is taken. The silicon sheet or quartz sheet is subjected to ultrasonic cleaning in acetone, isopropanol, and water respectively for 10 minutes, and then dried with nitrogen. Then, by means of evaporation, the surface of the silicon sheet or quartz sheet is evaporated with 10 nm of titanium and 100 nm of gold successively as an anti-transmission layer. A polyimide tape (the thickness is 50-100 μm) is adhered on the gold surface. There should be no bubbles between the polyimide tape and the metal anti-transmission layer. Finally, a graphene layer is transferred on the polyimide tape.

Specifically, the transfer of graphene can be performed by using the following methods.

The purchased graphene is released into water for at least 2 hours. Tweezers are used to clamp the silicon sheet or quartz sheet with polyimide tape to adhere to the graphene in the water. After adjusting the graphene to a suitable position and removing the graphene from the water, the graphene is kept vertically for 3 minutes in a standing state to allow excess water to flow out and then the graphene is dried for 30 minutes. Thereafter, the graphene is dried in an oven at 100° C. for 20 minutes. The graphene is kept still to room temperature, and acetone is added to the graphene for soaking for about 10 minutes. The PMMA protective layer on the surface is removed, and the graphene absorber is taken and washed with deionized water and dried with nitrogen.

(2) Fabrication of Graphene Absorbers with Patterns and Shapes

The shape of the graphene absorber that needs to be laser engraved is drawn. In this example, the shape of the graphene absorber is a triangle and a circle. The side length of the triangle and the diameter of the circle are both 8 mm. The laser engraving method is adopted to engrave the graphene absorber into a triangular or circular shape. The laser engraving machine used in this embodiment is a protolaser produced by LPKF, and the laser power is 1.1 W.

(3) The preparation of lactose solution

The lactose solution is prepared, and the concentration of lactose solution in this embodiment is 5 mg/L.

(4) The lactose solution is dripped on the surface of the graphene absorber

10 μL of lactose solution is taken, and the lactose solution is dripped on the surface of the cleaned graphene absorber. Three drops are added from the solution of each concentration, and three reference sample points (without any samples) are set. The surface of the graphene absorber is dried at room temperature, and the detection area of sample points to be detected is about 4 $mm^2$.

(5) The terahertz time-domain spectra of all sample points to be detected, reference sample points and metal mirrors on the surface of the graphene absorber are collected The laser, the computer, the controller and the nitrogen valve are turned on. Under the circumstances, the terahertz time-domain spectroscopy system starts to fill with nitrogen and the humidity drops. The laser can be measured after being preheated for half an hour. The cover of the terahertz time-domain spectroscopy system for measurement is opened, and the graphene absorber is placed into the detection optical path and fixed by a fixture. Under the condition of filling nitrogen, when the spectrum bandwidth of the terahertz time-domain spectroscopy system is 0.1-3.5 THz, the terahertz time-domain spectroscopy of the sample points to be detected and the reference sample points on the same graphene absorber are collected respectively. The metal mirror is placed into the detection optical path and fixed with a fixture. Under the condition of filling nitrogen, when the spectrum bandwidth of the terahertz time-domain spectroscopy system is 0.1-3.5 THz, the terahertz time-domain spectrum of the metal mirror is collected, wherein the humidity in measurement environment is required to be <0.2%, and the temperature is room temperature. The above method is used to measure the terahertz time-domain spectrum of the sample one by one, and the measured data is saved, thus obtaining the terahertz time-domain spectrum data set of all reference points to be detected and the reference sample points.

Figure 8:
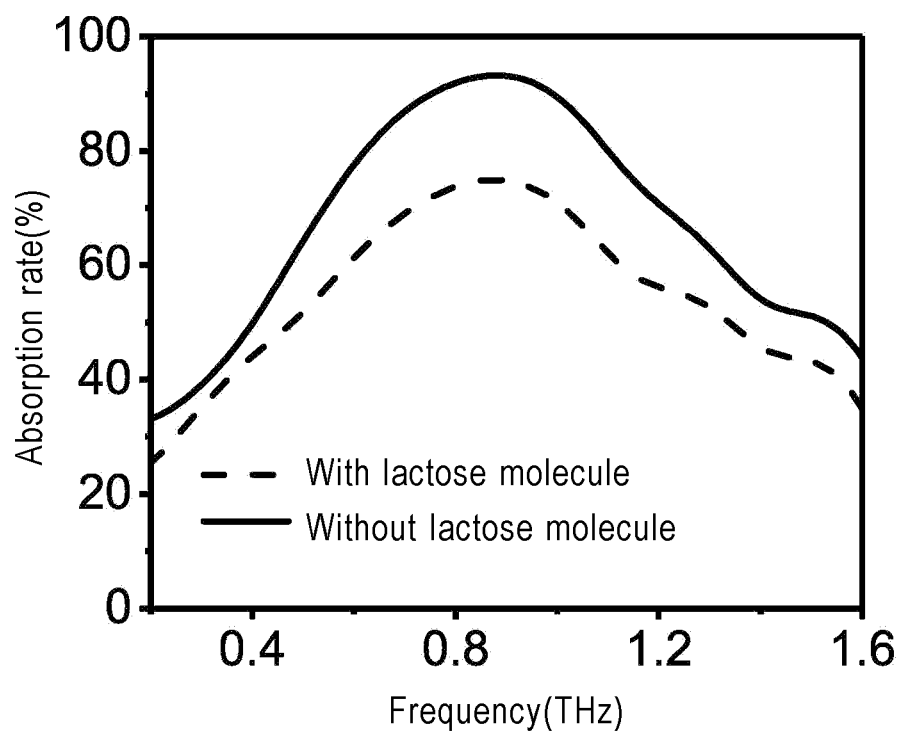
FIG. 8 is the absorption spectrum of the graphene absorber in Example 3 of the disclosure in the presence/absence of lactose molecules.

(6) The absorption rate of all sample points to be detected is calculated, and the intensity corresponding to the absorption peak is searched The fast Fourier transform is used to convert the terahertz spectrum time-domain signal of the sample to the frequency-domain signal, and the frequency-domain signal is used to obtain the absorption rate of the sample point to be detected. The intensity corresponding to the maximum value of the absorption peak is searched. Subtraction is performed on the intensity value of the sample point to be detected with respect to the intensity value of the reference sample point, so as to obtain the change in the intensity of the absorption peak. FIG. 8 is the absorption spectrum of the graphene absorber in the presence/absence of lactose molecules.

Based on the above implementation, it can be obtained that the disclosure uses the interaction between the graphene and the sample to change the absorption peak of the graphene absorber, thereby amplifying the sample signal. The method has high detection sensitivity, is simple and quick to operate, and can meet the increasing demand for rapid detection.

The above specific embodiments are used to explain the disclosure, not to limit the disclosure. Any modification and change made to the disclosure within the spirit of the disclosure and the protection scope of the claims shall fall into the protection scope of the disclosure.

What is claimed is:
1. A sample signal amplification method using a terahertz band graphene absorber, comprising the following steps:
step 1) fabrication of the graphene absorber: the graphene absorber containing graphene, polyimide, and a metal anti-transmission layer from top to bottom is fabricated;
step 2) various sample solutions of different concentrations are prepared;
step 3) the sample solution is dripped on a surface of the graphene absorber: the sample solution is dripped on the surface of the cleaned graphene absorber, at least three drops are added from the solution of each concentration, and the drop is added at the same amount each time, three reference sample points are arranged freely, and a position of the reference sample point is different from that of a sample point to be detected, and the surface of the graphene absorber is dried at room temperature after dripping the solution;
step 4) terahertz time-domain signals of all the sample points to be detected and the reference sample points on the surface of the graphene absorber are collected: under a nitrogen atmosphere, the terahertz time-domain signals of the sample point to be detected and the reference sample point are respectively collected from the same graphene absorber in the spectral bandwidth of 0.1-10 THz; and step 5) the intensity change of an absorption peak of the graphene absorber is obtained from the terahertz time-domain signal:
fast Fourier transform is adopted to convert the terahertz time-domain signal to a frequency-domain signal, an absorption rate of the sample point to be detected and an absorption rate of the reference sample point are calculated based on the frequency-domain signal, a difference between the absorption rate of the sample point to be detected and the absorption rate of the reference sample point is adopted as a detection signal, realizing amplification of the sample signal.

2. The sample signal amplification method using the terahertz band graphene absorber according to claim 1, wherein,
in the step 1), the graphene absorber is made in the following way:
step 1.1) evaporation of metal on a surface of a silicon sheet or a quartz sheet;
the cleaned silicon sheet or quartz sheet is taken, and titanium with a thickness of 10 nm and gold with a thickness of 100-200 nm are formed on the surface of the silicon sheet or the quartz sheet successively via the evaporation;
step 1.2) a polyimide tape or a polyimide layer is applied;
the polyimide tape is gently adhered on the surface of the metal-evaporated silicon sheet or quartz sheet or the thin polyimide layer is added on the metal surface by means of homogenization; and
step 1.3) finally, a layer of the graphene is transferred on the polyimide tape or the thin polyimide layer.

3. The sample signal amplification method using the terahertz band graphene absorber according to claim 1, wherein, in the step 1), the graphene absorber is fabricated in the following manner, wherein the graphene absorber obtained by the following method is flexible: to fabricate the flexible graphene absorber with metal as the anti-transmission layer, a thin polyimide film is taken, a metal layer is formed on a surface of the thin polyimide film via the evaporation, and the graphene is transferred on the other surface of the thin polyimide film after the evaporation is completed.

4. The sample signal amplification method using the terahertz band graphene absorber according to claim 1, wherein in the step 1), the graphene absorber is fabricated in the following manner, wherein the graphene absorber obtained by the following method is flexible: to fabricate the flexible graphene absorber with a conductive tape as the anti-transmission layer, a thin polyimide film is taken, the graphene is transferred on one surface of the thin polyimide film, and the conductive tape is adhered on the other surface of the thin polyimide film after the transfer is completed.

5. The sample signal amplification method using the terahertz band graphene absorber according to claim 1, wherein a thickness of the polyimide is 10-100 μm.

6. The sample signal amplification method using the terahertz band graphene absorber according to claim 1, wherein in the step 1), the graphene is obtained by chemical vapor deposition or mechanical exfoliation, and the number of layers of the graphene is 1-10.

7. The sample signal amplification method using the terahertz band graphene absorber according to claim 1, wherein when the terahertz time-domain signal is collected in the step 4), a detection area of the sample point to be detected is greater than 1 $mm^2$, and a humidity of a measurement environment is less than 0.2%.

8. The sample signal amplification method using the terahertz band graphene absorber according to claim 1, wherein the sample solution adopts chlorpyrifos methyl, lactose, or chlorothalonil.

9. The sample signal amplification method using the terahertz band graphene absorber according to claim 1, wherein a concentration range of the sample solution obtained in the preparation of step 2) is between 0.01 mg/L and 100 mg/L; in the step 3), the amount of each drop of the sample solution is 5 to 200 µL.

10. The sample signal amplification method using the terahertz band graphene absorber according to claim 1, wherein in the step 3), the graphene absorber is cleaned in the following manner: the complete graphene absorber is taken, the graphene absorber is washed with deionized water, acetone, and deionized water successively, and dried with nitrogen.

\* \* \* \* \*